(12) United States Patent
Tucker et al.

(10) Patent No.: US 10,101,777 B1
(45) Date of Patent: Oct. 16, 2018

(54) RETRACTABLE CAMERA

(71) Applicant: Lenovo (Singapore) Pte. Ltd., Singapore (SG)

(72) Inventors: Matthew Ian Tucker, Durham, NC (US); Ali Kathryn Ent, Raleigh, NC (US); Cuong Huy Truong, Cary, NC (US); Peter Carlson Rane, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/482,749

(22) Filed: Apr. 8, 2017

(51) Int. Cl.
   *G06F 1/16* (2006.01)
   *H04N 5/232* (2006.01)
   *H04N 5/225* (2006.01)

(52) U.S. Cl.
   CPC .......... *G06F 1/1686* (2013.01); *G06F 1/1616* (2013.01); *H04N 5/2252* (2013.01); *H04N 5/2253* (2013.01); *H04N 5/2254* (2013.01); *H04N 5/2256* (2013.01); *H04N 5/23241* (2013.01)

(58) Field of Classification Search
   CPC .............................. G06F 1/1616; G06F 1/1686
   See application file for complete search history.

(56) References Cited

U.S. PATENT DOCUMENTS

| 5,719,799 | A  | * | 2/1998  | Isashi    | G06F 1/1618  |
|-----------|----|---|---------|-----------|--------------|
|           |    |   |         |           | 345/169      |
| 5,748,441 | A  | * | 5/1998  | Loritz    | G06F 1/1616  |
|           |    |   |         |           | 345/169      |
| 5,880,928 | A  | * | 3/1999  | Ma        | G06F 1/1616  |
|           |    |   |         |           | 361/679.23   |
| 6,812,958 | B1 | * | 11/2004 | Silvester | G06F 1/1607  |
|           |    |   |         |           | 348/207.1    |
| 7,477,315 | B2 | * | 1/2009  | Shin      | H04N 5/2252  |
|           |    |   |         |           | 348/373      |
| 7,911,783 | B2 | * | 3/2011  | Hsieh     | G06F 1/1639  |
|           |    |   |         |           | 345/7        |
| 8,253,851 | B2 | * | 8/2012  | Liu       | G06F 3/021   |
|           |    |   |         |           | 348/373      |
| 2004/0198433 | A1 | * | 10/2004 | Lee    | H04N 5/2251  |
|           |    |   |         |           | 455/556.1    |
| 2004/0246371 | A1 | * | 12/2004 | Cho    | H04N 5/2254  |
|           |    |   |         |           | 348/375      |
| 2007/0253703 | A1 | * | 11/2007 | Tsai   | G03B 17/02   |
|           |    |   |         |           | 396/429      |

(Continued)

OTHER PUBLICATIONS

Dual Electronics Corporation, DMH25 Operation Manual, May 2016 (7 pages).

(Continued)

*Primary Examiner* — Antoinette Spinks
(74) *Attorney, Agent, or Firm* — Brian J. Pangrle

(57) ABSTRACT

A device can include a processor; memory operatively coupled to the processor; a display housing that includes a display operatively coupled to the processor; a keyboard housing that includes a keyboard operatively coupled to the processor, a retractable camera operatively coupled to the processor, and a socket mechanism that translates the retractable camera between a retracted state and an extended state; and a hinge that couples the display housing to the keyboard housing.

20 Claims, 14 Drawing Sheets

(56) References Cited

U.S. PATENT DOCUMENTS

2008/0136973 A1* 6/2008 Park ................. G03B 29/00
348/744
2009/0322967 A1* 12/2009 Liou ................. G06F 1/1616
348/744

OTHER PUBLICATIONS

HP, Ic100w, Mini WiFi Cam, User Manual, Nov. 2014 (52 pages).
Sony, Advantage of the CMOS Sensor, May 2011 (8 pages).
Lazar et al., LI-FI Design for High Speed Data Transmission, ARPN Journal of Engineering and Applied Sciences, vol. 10, No. 14, Aug. 2015 (5 pages).
Jeffries, Lenovo Ideacentre AI0 Y910 Review and Ratings, Jan. 17, 2017, Computer Shopper, accessed online http://www.computershopper.com/desktops/reviews/lenovo-ideacentre-aio-y910 (Apr. 8, 2017) (17 pages).
Texas Instruments, TMS320DM642 Digital Media Processor, Technical Overview, Application Report SPRU615—Sep. 2002 (43 pages).

* cited by examiner

RETRACTABLE CAMERA

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

A device can include a processor; memory operatively coupled to the processor; a display housing that includes a display operatively coupled to the processor; a keyboard housing that includes a keyboard operatively coupled to the processor, a retractable camera operatively coupled to the processor, and a socket mechanism that translates the retractable camera between a retracted state and an extended state; and a hinge that couples the display housing to the keyboard housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
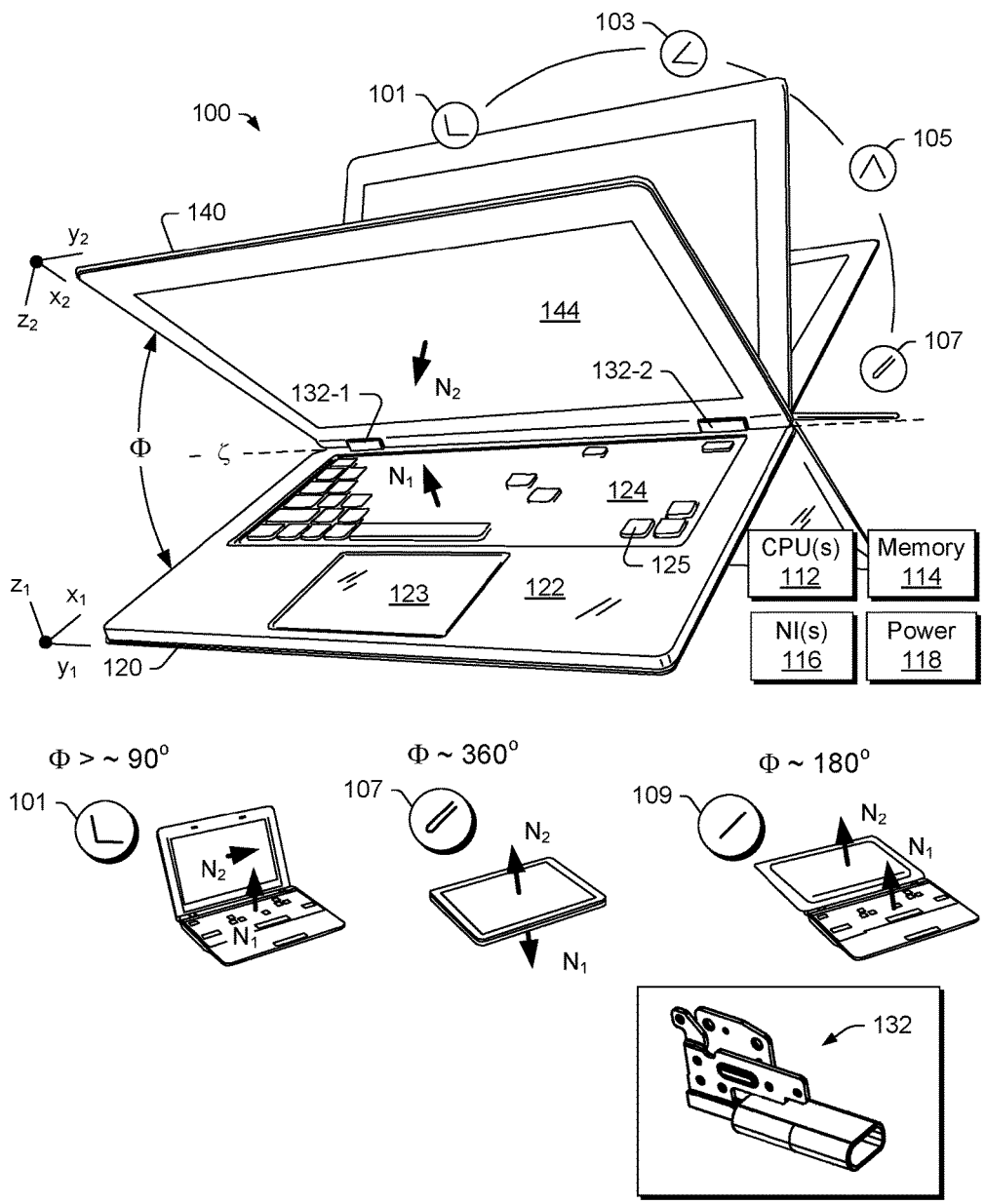
FIG. 1 is a diagram of an example of a device.

FIG. 1 shows an example of a device 100 that includes a keyboard housing 120 and a display housing 140 that are pivotable with respect to each other via movement about one or more hinges 132-1 and 132-2 (e.g., hinge assemblies). An example of a hinge assembly 132 is shown in a perspective view where the hinge assembly includes two saddles and a housing that covers gears that mesh two axles where one of the axles is connected to one saddle (e.g., a keyboard housing saddle) and where another one of the axles is connect to the other saddle (e.g., a display housing saddle). The hinge assembly 132 may allow for 0 degree to 360 degree orientation of the housings 120 and 140, for example, the hinge assembly 132 as shown may correspond to a closed clamshell orientation of the housings 120 and 140 or to a tablet orientation of the housings 120 and 140. The device 100 may be a device such as, for example, a computing device (e.g., an information handling device). The device 100 may be described by a form factor and referred to as a laptop computer or a notebook computer (e.g., a "laptop" or "notebook"). As an example, a display carried by a display housing may be described by a diagonal dimension, which may be, for example, a diagonal dimension in a range from about 10 cm to about 50 cm.

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. As an example, the device 100 may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

As an example, a device can include a processor; memory operatively coupled to the processor; a display housing that includes a display operatively coupled to the processor; a keyboard housing that includes a keyboard operatively coupled to the processor, a retractable camera operatively coupled to the processor, and a socket mechanism that translates the retractable camera between a retracted state and an extended state; and a hinge that couples the display housing to the keyboard housing. For example, the device 100 can include a retractable camera and a socket mechanism that translates the retractable camera between a retracted state and an extended state.

As an example, a retractable camera can be incapable of acquiring images in a retracted state. For example, when a user desires privacy, the user may transition a retractable camera from an extended state to a retracted state where, in the retracted state, the camera is not capable of acquiring images. In such an example, the retractable camera may be one or more of electrically disconnected from circuitry of a device (e.g., a computing device, a keyboard housing, etc.) and covered in a manner where a lens (e.g., an aperture) of the retractable camera cannot acquire images (e.g., full field of view images). As an example, in a retracted state, a retractable camera may be oriented such that a lens (e.g., an aperture) of the retractable camera faces in a particular direction such as, for example, toward a bottom side of a keyboard housing. As an example, upon transitioning from a retracted state to an extended state, a retractable camera may automatically be oriented such that a lens (e.g., an aperture) of the retractable camera can acquire images of a user of a keyboard housing (e.g., a keyboard housing of a laptop computing device).

As an example, a retractable camera can include an "air gap" in a retracted state. For example, in a retracted state an air gap may exist between an interface or interfaces of the retractable camera and an interface or interfaces of a keyboard housing. Thus, in the retracted state, the retractable camera may be immune from hacking. As an example, a retractable camera may provide a user with a complete security option where the user has confidence about the retractable camera, because when the camera is not in use, it is garaged inside a keyboard housing (e.g., of a laptop computer) without an ability to view the outside world. As an example, a retractable camera can include a microphone that is mechanically connected in the extended state and mechanically disconnected in the retracted state. In such an example, an "air gap" can exist between circuitry of a computing device and the microphone. Such an approach can prohibit activation of the microphone when the retractable camera is in the retracted state. As an example, in a retracted state, a retractable camera that includes at least one camera and at least one microphone may be in an "air gap" state where the at least one camera and the at least one microphone cannot be activated and/or cannot transmit information (e.g., consider an air gap or air gaps as to data interfaces). As an example, a socket mechanism of a keyboard housing may include a switch that can physically switch a microphone of a device on for an extended state of a retractable camera and off for a retracted state of the retractable camera. In such an example, the microphone may be in or otherwise carried by the keyboard housing. In such an example, in the retracted state, an air gap may exist between circuitry of the microphone and circuitry of the keyboard housing and, in an extended state, physical electrical contact may be made between circuitry of the microphone and circuitry of the keyboard housing (e.g., via electrical contacts).

Where a retractable camera is carried by a keyboard housing, a display housing may be camera free (i.e., without a camera) or, for example, the display housing may include a back facing camera that does not face a user that is in front of a display of the display housing. In such examples, a display housing can include a display that is bezel-less or that has a bezel that is less than about 5 percent a surface area of a front side of a display housing where a display surface area is about 95 percent or more. Such an approach can help to minimize inactive areas around a display. When such "black border" areas are large, a laptop may be perceived as being old-fashioned and/or low quality; whereas, if the borders around a display are small, the laptop may be perceived as being modern and/or high quality. Narrow borders can allow for a larger display to fit in a smaller laptop body (e.g., display housing), which can improve portability (e.g., display size with respect to housing size).

As an example, a retractable camera in a keyboard housing of a laptop computer can alleviate inclusion of a camera mounted in a region above a display of a display housing. Where a retractable camera is present in a region below a display of a display housing, particularly attached to a keyboard housing of a laptop, a thin border may be utilized above a display of a display housing. For example, a display may extend to within a few millimeters of an edge of a display housing (e.g., consider about 5 mm or less or about 3 mm or less).

As an example, a retractable camera may be utilized for acquiring video and/or still images (e.g., photographs). A camera fixed in place in a bezel area above a display of a display housing of a laptop can be ill-suited or awkward for use in taking a picture of a subject that is not a user of the laptop as the user would have to pick up the laptop and rotate it 180 degrees away from himself so that the screen is also pointing away from him. In such an orientation, aiming the camera and adjusting settings can be impractical (e.g., awkward, inconvenient, etc.). As an example, a retractable camera may be oriented in a direction that allows a user to keep the display of the laptop facing towards the user while viewing a subject to be captured, while adjusting one or more setting, while interacting with a touchscreen display, etc. For example, a retractable camera may be rotatable about an axis to point a lens (e.g., an aperture) of the retractable camera away from the user instead of towards the user. In such a manner a user can photograph subjects that are in front of her, while keeping the display pointed toward her.

A retractable camera may avoid the inclusion of a camera in a display housing where a lens (e.g., an aperture) of the camera faces a user that is in front of a display of the display housing.

A laptop may have a display housing that is camera-less. For example, a display housing may be free of a front facing camera and/or a back facing camera. As an example, a laptop can include a keyboard housing that includes a camera that can be oriented to face a user in front of a display of a display housing of the laptop and can be oriented to face away from the user while the user may, if desired, view what the retractable camera sees on the display. As an example, a retractable camera can be the only camera of a laptop (see, e.g., the device 100 of FIG. 1, etc.).

As an example, a retractable camera may be utilized for video conferencing and/or photography. As an example, a retractable camera can be included in a laptop proximate to a hinge that operatively couples a display housing and a keyboard housing of the laptop where, for example, the retractable camera is carried by the keyboard housing (e.g., within a few centimeters of the hinged ends of the housings).

As an example, a method can include mounting a camera such that it can be garaged in a keyboard housing of a laptop (i.e., not in the display housing). In such an example, the camera can be extended outwardly from a garaged position when use of the camera is desired. As an example, a retractable camera can be rotatable to adjust the camera's angle, for example, in relation to a user of the laptop and, for example, to allow the camera to be aimed at one or more subjects that may be behind the laptop (e.g., on an opposite side of the laptop from a user).

For laptops that can fold approximately 360 degrees into a tablet mode, a retractable camera that is rotatable can, for example, enable videography and/or photography.

As an example, where a retractable camera is garaged inside a keyboard housing of a laptop, it can be in a state that has no view of the outside world and, for example, in a fail-safe privacy state. As an example, a camera can be adjustable as to angle or optionally angles (e.g., as opposed to a fixed to the display housing camera). As an example, a camera may be adjustable as to angle or angles independently of an angle between a display housing and a keyboard housing. For example, where the camera is carried by a keyboard housing, a user may adjust the angle of the display housing without the view of the camera being altered (e.g., a user can adjust the angle of the display and the angle of view of the camera independently). In such an example, a user can set a display housing at a certain angle to avoid glare onto a display (e.g., from ceiling lights, sunlight, etc.) while independently adjusting the camera to suitably frame the user's face (e.g., the user's face within a field of view of the camera); whereas, if a camera is fixed to a display housing, the desired screen angle might point the camera above or below the user's face, making it un-useful for video conferencing. As an example, a method can include setting a display housing of a laptop at a desired angle and adjusting a camera of a keyboard housing of the laptop to point directly at a face of a user of the laptop.

Figure 2:
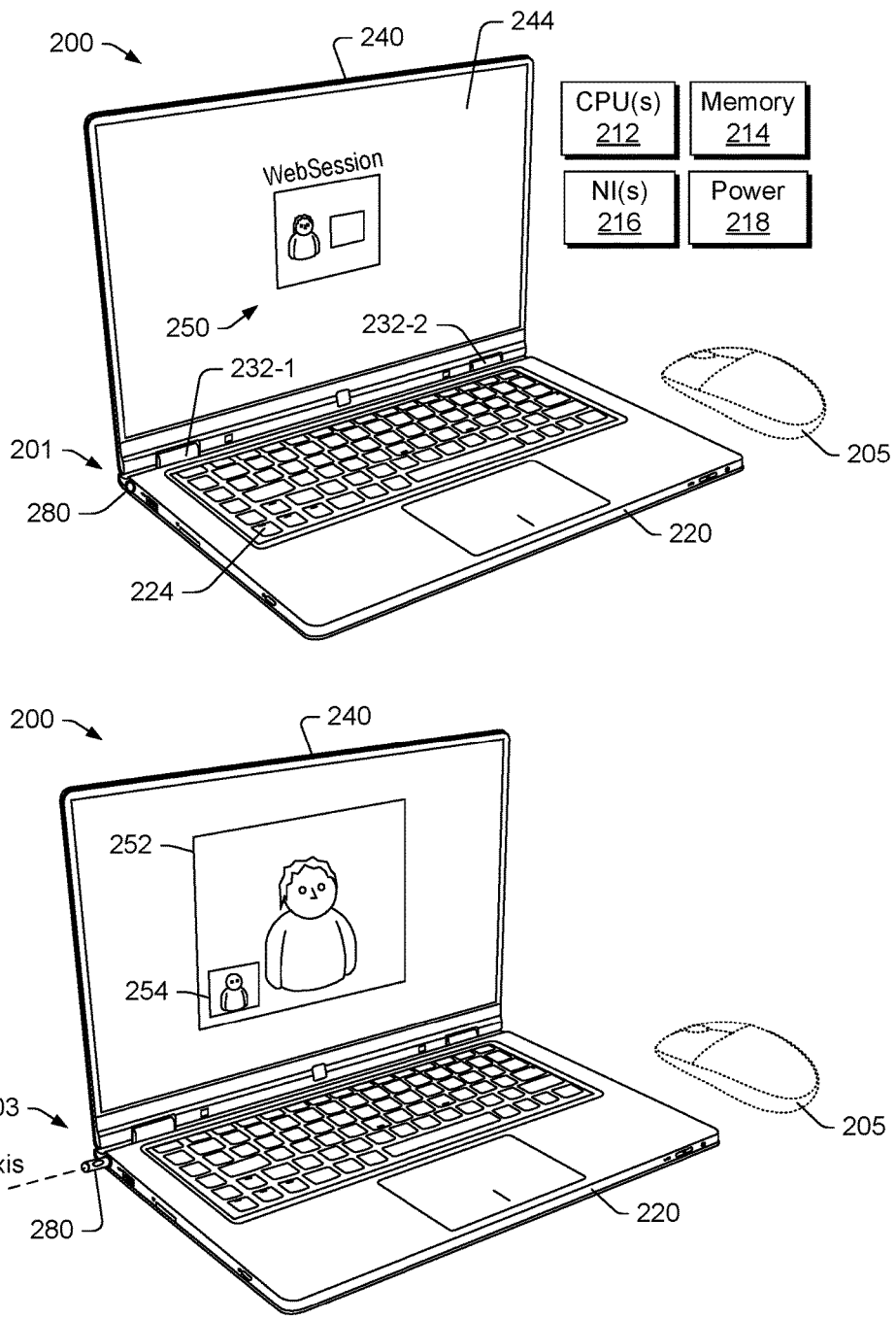
FIG. 2 is a diagram of an example of a device and examples of states of a retractable camera of the device.

FIG. 2 shows an example of a device 200 that includes a processor 212 or processors, memory 214 accessible by the processor 212 (e.g., or one or more processors); a display housing 240 that includes a display 244 operatively coupled to the processor 212 (e.g., or one or more processors); a keyboard housing 220; a first hinge assembly 232-1 and 232-2 that operatively couples the keyboard housing 220 to the display housing 240; and a retractable camera 280 that is shown as being in a retracted state 201 and as being in an extended state 203. In the example of FIG. 2, the retractable camera 280 can be operatively coupled to the processor 212 (e.g., or one or more processors) and, as an example, may be optionally decoupled therefrom. For example, in the retracted state 201, the retractable camera 280 may be decoupled from one or more circuits of the device 200, which can include, for example, one or more of a circuit for power, a circuit for control, a circuit for data transmission or another type of circuit associated with operation of the retractable camera 280. For example, an interface or interfaces may be decoupled and in an "air gap" state.

In FIG. 2, one or more coordinate systems may be utilized to describe one or more features (see, e.g., FIG. 1). In the example of FIG. 2, the retractable camera 280 is shown as including an axis ($\eta$-axis) where the retractable camera can move along the axis. For example, the retractable camera 280 can be translatable along the axis for transitioning the retractable camera 280 from one state to another state (see, e.g., the states 201 and 203). As an example, the retractable camera 280 may be rotatable about the axis. In such an example, the retractable camera 280 may optionally be adjustable. As an example, the retractable camera 280 may rotate upon transitioning from one state to another state. For example, the retractable camera 280 may rotate from a first rotational orientation to a second rotational orientation where the second rotational orientation is associated with the extended state 203 to orient a lens (e.g., an aperture) of the retractable camera 280 in a direction that may be expected for a user's face.

In the example of FIG. 2, the display 244 includes graphics 250 rendered thereto as associated with an application such as a videoconferencing application that may initiate a "web session" (e.g., a session implemented at least in part through use of the World Wide Web and/or the Internet). In the example of FIG. 2, the display includes images 252 and 254 (e.g., rendered in a graphical user interface) that are associated with a videoconferencing application where the image 254 may be an image of a user of the device 200 as captured via the retractable camera 280 in the extended state 203.

As an example, the retractable camera 280 may be actuated automatically by circuitry of the device 200. For example, upon receipt of a meeting request and acceptance of the meeting request, the retractable camera 280 may automatically transition from the retracted stated 201 to the extended state 203. For example, the retractable camera 280 can be operatively coupled to a mechanism that may be motorized, spring-loaded, etc. that causes the retractable camera 280 to extend in response to a signal associated with acceptance of a meeting request. As an example, where a user of the device 200 initiates a meeting (e.g., via instructing the device 200 to transmit a meeting request via one or more of the one or more network interfaces 216), the retractable camera 280 may be automatically extended. For example, a graphical user interface associated with a videoconferencing application may include one or more graphical controls that can be selected via a point device such as a mouse 205, a touchpad, a touch of a touchscreen display, etc., to cause the retractable camera 280 to transition from the retracted state 201 to the extended state 203. As an example, a graphical control may be rendered to the display 244 that is operatively coupled to a mechanism that can control at least one state transition of the retractable camera 280. For example, a user may click on the graphical control (e.g., or touch the graphical control) and the device 200 may actuate a mechanism to extend the retractable camera 280 outwardly from the keyboard housing 220. Such a transition may also activate the retractable camera 280 for video and/or still image capture. As an example, upon ending a web session, a mechanism may retract the retractable camera 280 to transition it from the extended state 203 to the retracted state 201 (e.g., garaged state).

As mentioned, the device 200 may be interacted with using an input device such as the mouse 205. As shown in FIG. 2, the mouse 205, if present, may be located to the right-hand side of the device 200. Such an arrangement may be common for users that are right-handed. As shown in the example of FIG. 2, the retractable camera 280 is located on the left-hand side of the device 200. In such an arrangement, utilization of the mouse 205 on the right-hand side may alleviate risk of interference (e.g., from the mouse 205, from a hand, from an arm, etc.).

As an example, a device such as the device 200 may include a left-hand side retractable camera and/or a right-hand side retractable camera. As an example, a device may be configured with sockets that can receive a retractable camera or retractable cameras. In such an example, a user may be able to insert the retractable camera into one of two sockets (e.g., a left-hand side socket and a right-hand side socket). As an example, a device can include two retractable cameras that may be on opposing sides where a user may be able to select whether to use one or both of the retractable cameras (e.g., via a graphical user interface, via settings, via manual deployment, etc.).

Figure 3:
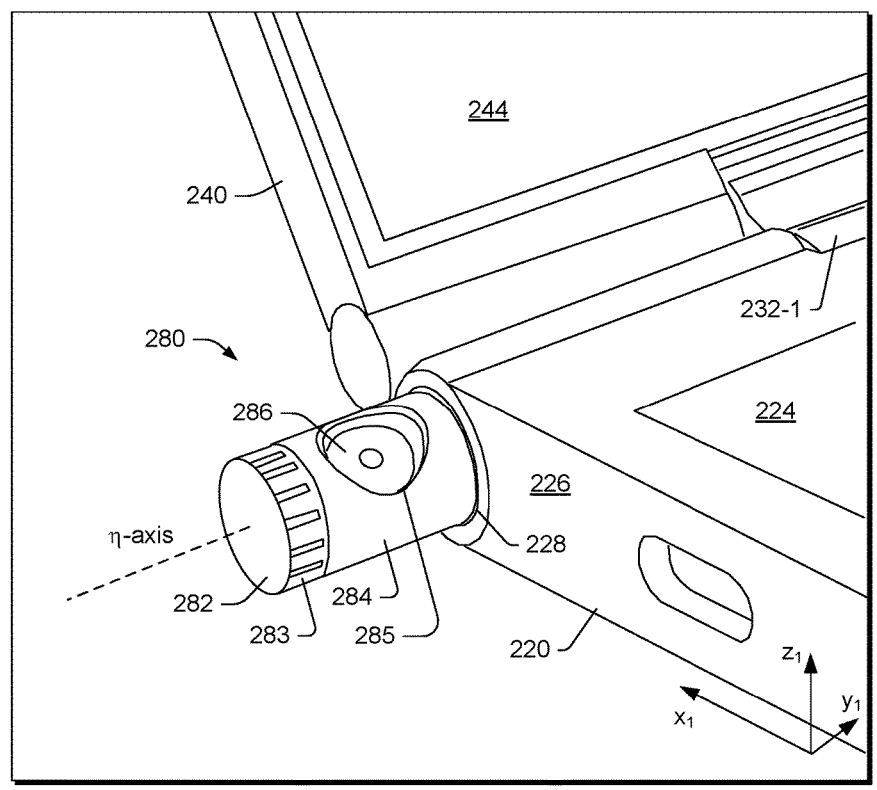
FIG. 3 is an enlarged view of an example of a retractable camera of the device of FIG. 2.

FIG. 3 shows an enlarged view of a portion of the device 200 with the retractable camera 280 in the extended state 203. In the example of FIG. 3, the keyboard housing 220 includes a side 226 with a socket 228 from which at least a portion of the retractable camera 280 can extend. As shown, the retractable camera 280 can include an end 282, knurls 283, a housing 284 with an opening 285 for a camera aperture 286 (e.g., a camera lens, etc.). In the example of FIG. 3, the knurls 283 may provide for friction between a finger or fingers of a user to adjust a rotational angle of the camera aperture 286 about the axis. While the knurls 283 are shown, a retractable camera may be free of knurls and/or may include one or more other features that may assist a user with adjusting and/or transitioning the retractable camera 280.

In FIG. 3, a coordinate system is illustrated, which may be utilized to describe one or more features. For example, the socket 228 may be described as being at or proximate to a hinge end of the keyboard housing 220 as may be at an end of an $x_1$ axis and, for example, the η-axis may be substantially aligned with a $y_1$ axis. As shown, the retractable camera 280 may be disposed a distance from the hinge 232-1. As an example, the retractable camera 280 may extend a distance outwardly from the side 226, which may be defined via the $y_1$ axis. As an example, the socket 228 may be defined by one or more axes of the coordinate system and the retractable camera 280 may be defined by one or more axes of the coordinate system.

In the example of FIG. 3, the retractable camera 280 is substantially cylindrical and may be defined, for example, via at least a diameter and an axial length. In the example of FIG. 3, the keyboard housing 220 can be made of an opaque material (e.g., a plastic, a metal, an alloy, etc.) such that when the retractable camera 280 is in the retracted state 201 (see, e.g., FIG. 2), the camera aperture 286 is covered by the opaque material (e.g., directly and/or indirectly).

Figure 4:
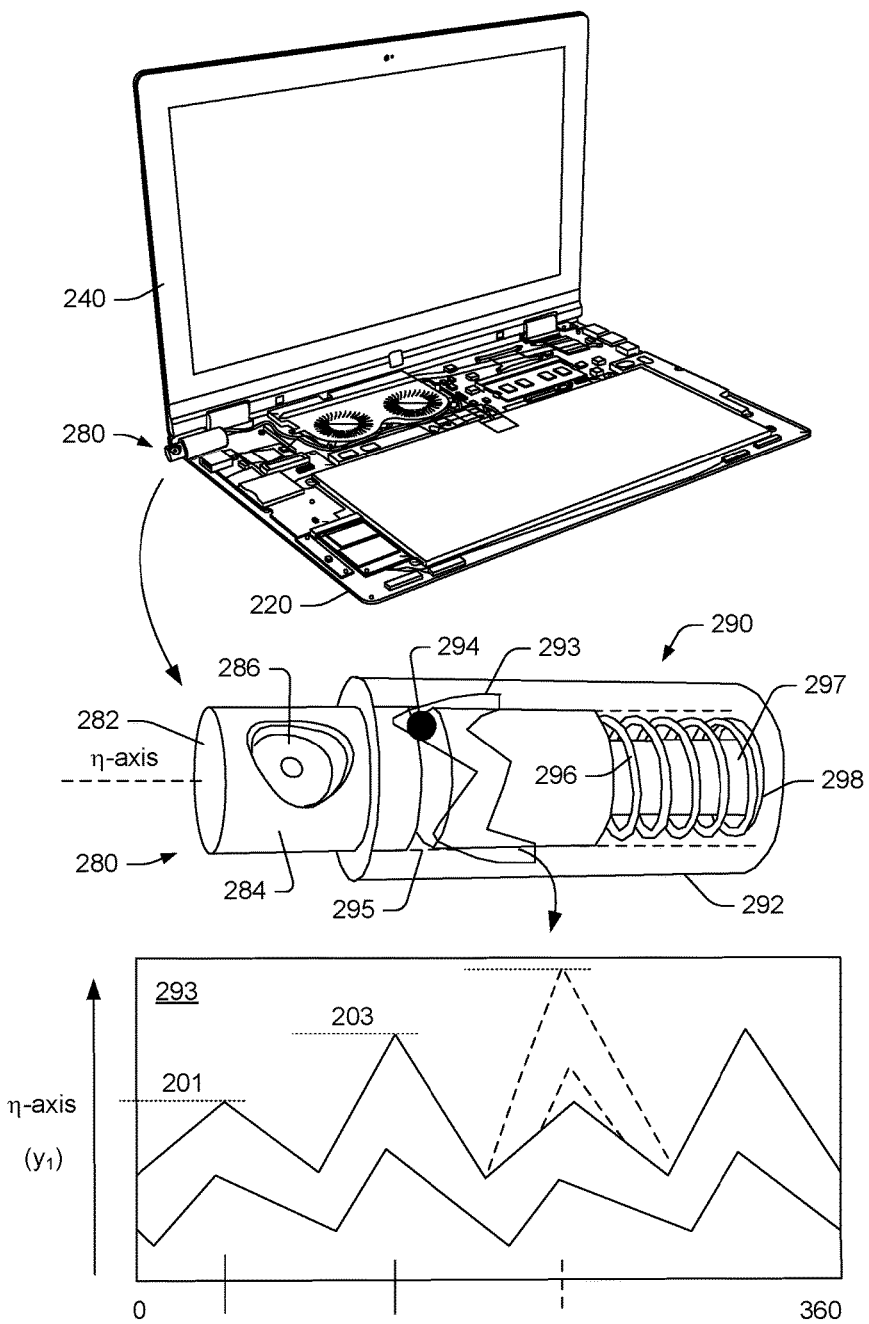
FIG. 4 is a series of diagrams of the device of FIG. 2 and an example of a mechanism.

FIG. 4 shows the device 200 in a partially disassembled state with the keyboard 224 of the keyboard housing 220 removed, which exposes components where one of the components is the retractable camera 280 along with an example of a mechanism 290, which can be referred to as a camera transitioning mechanism. Other components of the device 200 include a power cell or power cells, air mover or air movers, etc. The device 200 can include one or more interfaces that electronically couple circuitry of the display housing 240 and circuitry of the keyboard housing 220. As an example, a device may include a detachable tablet portion. For example, the display housing 240 may be detachable from the keyboard housing 220. As an example, a display housing 240 may be operatively coupled to a keyboard housing via a single hinge, which can be centrally located where the housings may be rotated about the single hinge. As an example, a device can be a twist device that includes a center hinge on which a display housing can pivot to support various modes of operation: a laptop mode, a presentation mode where the display housing can be rotated to face its display toward an audience (e.g., away from a user), a tent mode which allows the device to stand upright (e.g., for movie, other media viewing, etc.) and a tablet mode where the display housing folds down to cover the keyboard housing.

In the example of FIG. 4, the mechanism 290 includes a cylindrical body 292 with a through bore that includes a shaped groove 293 that can receive at least a portion of a ball 294 where the housing 284 of the retractable camera 280 includes a shaped groove 295 that can receive at least a portion of the ball 294. The mechanism 290 can be referred to as a socket mechanism because it includes a socket for receipt of a translatable camera, which can also be a rotatable camera (e.g., a translatable and rotatable camera with respect to the socket of the socket mechanism). In the example of FIG. 4, the mechanism 290 includes a biasing member 296, which may be a spring (e.g., a coil spring, etc.). As shown, the biasing member 296 may receive a shaft 297 that extends from the housing 284 where the biasing member 296 is secured at a base 298. In such an example, the biasing member 296 may be fixed at the base 298 while the housing 284 of the retractable camera 280 is translatable with respect to the mechanism 290 while be biased by the biasing member 296 (e.g., the biasing member can apply a biasing force to the housing 284).

FIG. 4 also shows a plot of a shape pattern or shape patterns of the shaped groove 293 along with labels associated with the retracted state 201 and the extended state 203.

In the example of FIG. 4, as the shaped groove 295 of the housing 284 is annular, the housing 284 may be rotatable about the axis, for example, to adjust the camera aperture 286.

In the example of FIG. 4, a user may apply force to the housing 284 (e.g., via the end 282, etc.) to cause the housing 284 to translate and compress the biasing member 296. In such an example, the ball 294 can travel in the shaped groove 293 and become located at a different peak where each peak corresponds to a different axial position of the housing 284. In such an example, a user may push in and then release the retractable camera 280 to cause a state transition from the retracted state 201 to the extended state 203 and may push in and then release the retractable camera 280 to cause a state transition from the extended state 203 to the retracted state 201.

In the example of FIG. 4, a third state is indicated by a dotted line, which may be another extended state. For example, the retractable camera 280 may be selectively extended to a particular distance of a plurality of extended state distances. Where a retractable camera includes a flash, another camera, etc., an extended distance may correspond to an extended distance for use of such a feature or features.

Figure 5:
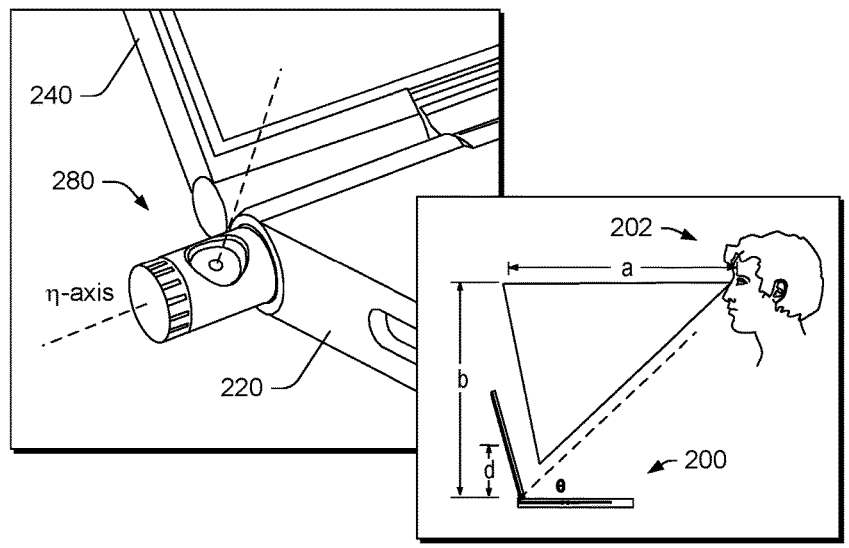
FIG. 5 is a series of diagrams of the device of FIG. 2.
Figure 5:
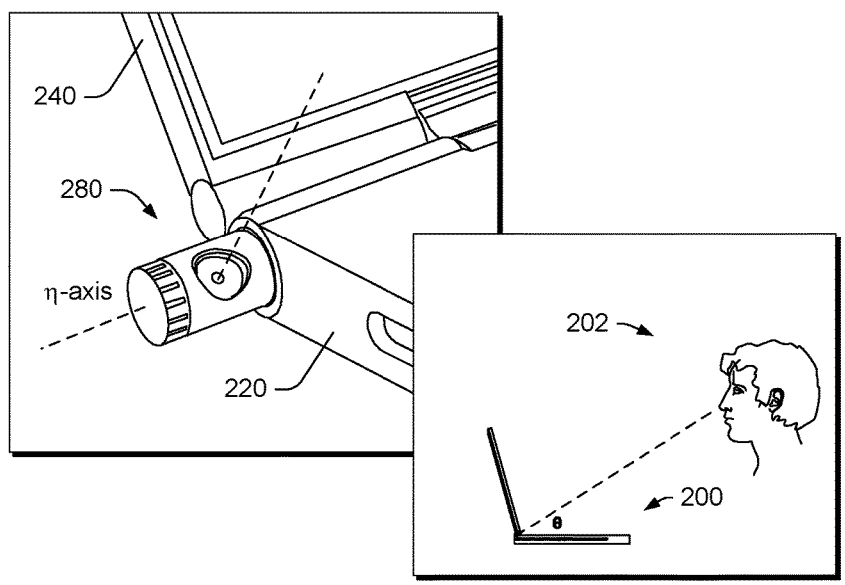

FIG. 5 shows orientations of the retractable camera 280 with respect to a user 202 where various distances and angles are shown. In particular, an adjustable angle Θ is shown in FIG. 5, which may be defined, for example, with respect to the keyboard housing 220. In the example orientations of FIG. 5, the retractable camera 280 is at an angle of about 45 degrees to about 30 degrees to accommodate the different positions of the face of the user 202.

Figure 6:
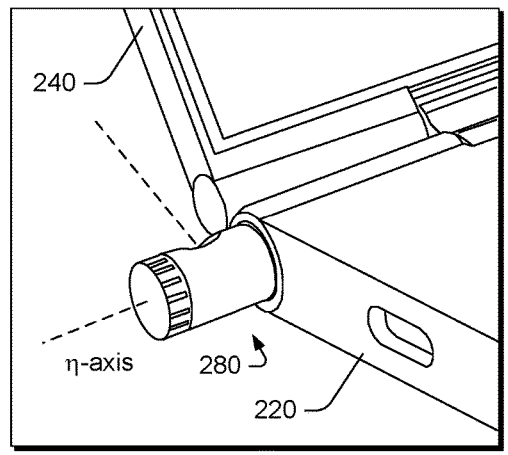
FIG. 6 is a series of diagrams of the device of FIG. 2.
Figure 6:
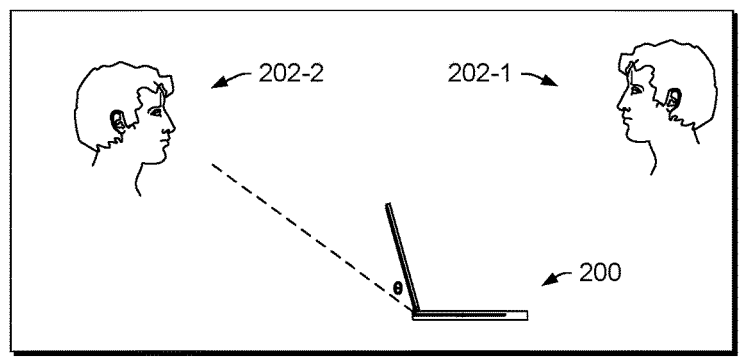

FIG. 6 shows another orientation of the retractable camera 280 with respect to two individuals 202-1 and 202-2 where an angle is shown. In the example orientations of FIG. 6, the retractable camera 280 is at an angle of about 145 degrees to accommodate the position of the face of the individual 202-2.

Figure 7:
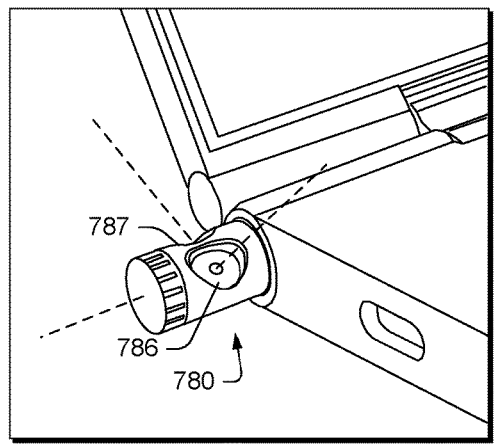
FIG. 7 is a series of diagrams of an example of a device that includes multiple cameras.
Figure 7:
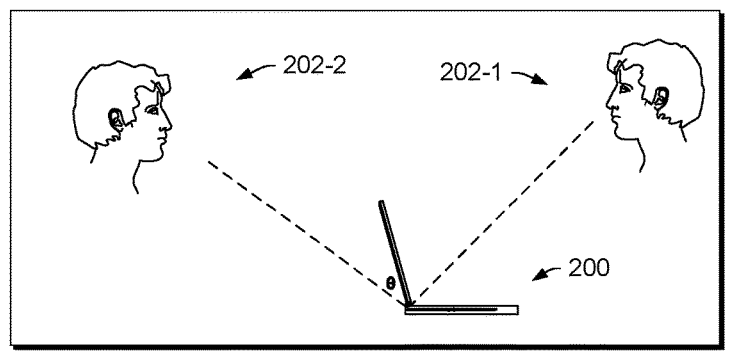

FIG. 7 shows the device 200 with a retractable camera 780 that includes two camera apertures 786 and 787, which can correspond to the retractable camera 780 including two cameras, one for each of the camera apertures 786 and 787. In such an example, the retractable camera 780 can be utilized for image capture of two individuals 202-1 and 202-2 where the two individuals 202-1 and 202-2 are on opposite sides of the device 200. As an example, the two cameras may be offset by an angle of approximately 90 degrees. As an example, an offset angle may be in a range from about 60 degrees to about 180 degrees.

Figure 8:
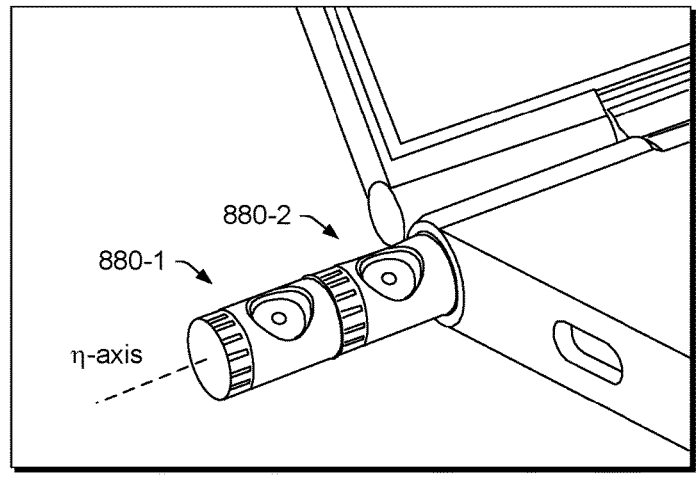
FIG. 8 is a series of diagrams of an example of a device that includes multiple cameras.
Figure 8:
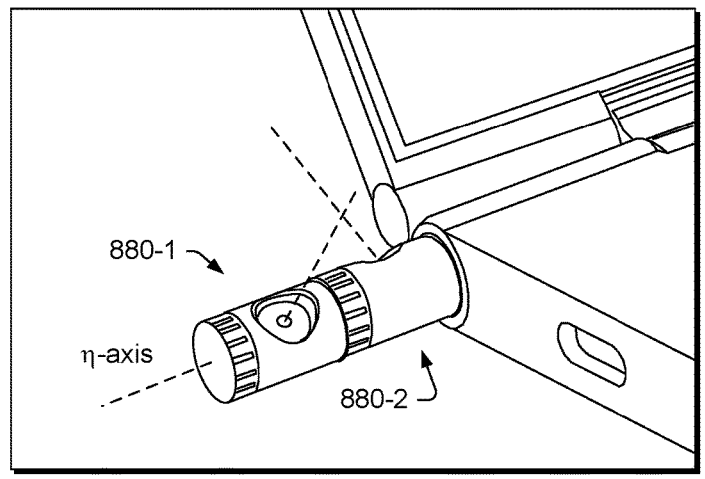

FIG. 8 shows an example of a device with two cameras 880-1 and 880-2, which may be optionally rotatable independently about the axis and, for example, translatable in unison. As an example, referring to the mechanism 290 of FIG. 4, the mechanism 290 may allow for two extended states, one with a single camera 880-1 and one with multiple cameras 880-1 and 880-2. In such an example, an application that executes using a processor of the device may automatically adjust to the state, for example, showing two images (e.g., one for each of the cameras 880-1 and 880-2) or a single image (e.g., for the camera 880-1).

Figure 9:
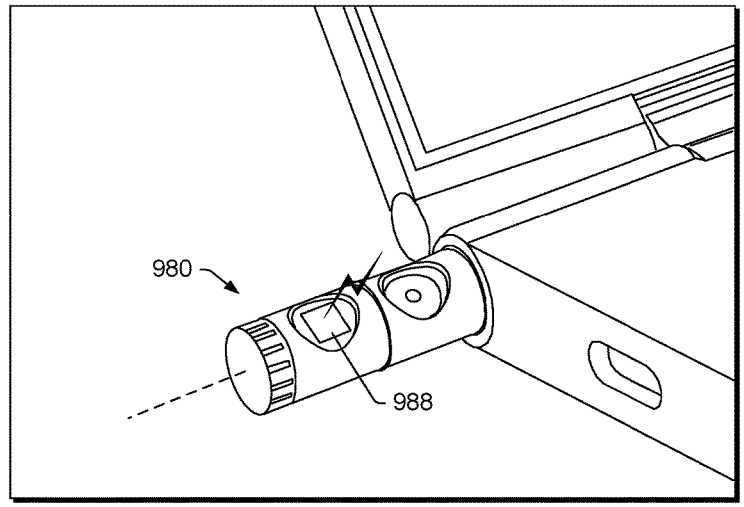
FIG. 9 is a series of diagram of an example of a device that includes a flash and an example of a device that includes a microphone.
Figure 9:
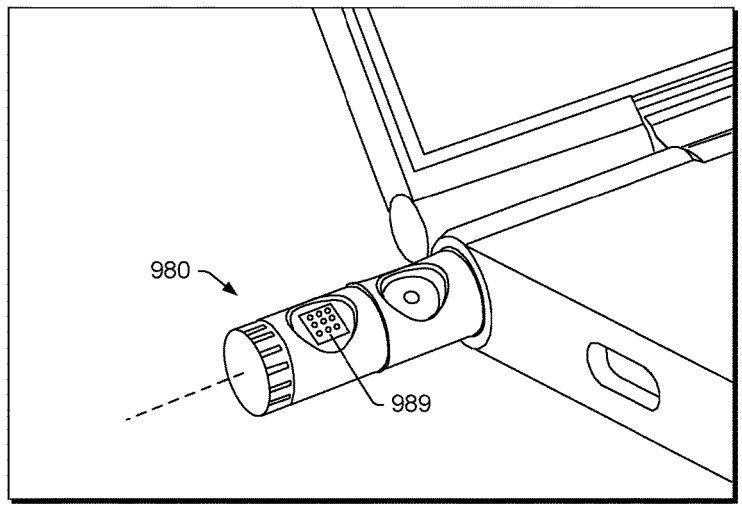

FIG. 9 shows an example of a device with a retractable camera 980 that includes a flash 988 (e.g., an electronic flash unit or lighting unit) and an example of a device with a retractable camera 980 that includes a microphone 989. As an example, the flash 988 may be a short flash or may provide for lighting a scene over an extended period of time. While the flash 988 is shown as being outboard, it may be located inboard. As an example, a retractable camera may include an outboard and an inboard flash. Or, for example, a retractable camera may include two cameras with a common flash or two cameras with two flashes. As an example, a flash may be rotatable, optionally independently of a camera aperture. While the microphone 989 is shown as being outboard, it may be located inboard. As an example, a retractable camera may include an outboard and an inboard microphone. Or, for example, a retractable camera may include two cameras with a common microphone or two cameras with two microphones. As an example, a microphone may be rotatable, optionally independently of a camera aperture. As an example, a retractable camera may include a microphone and a flash.

Figure 10:
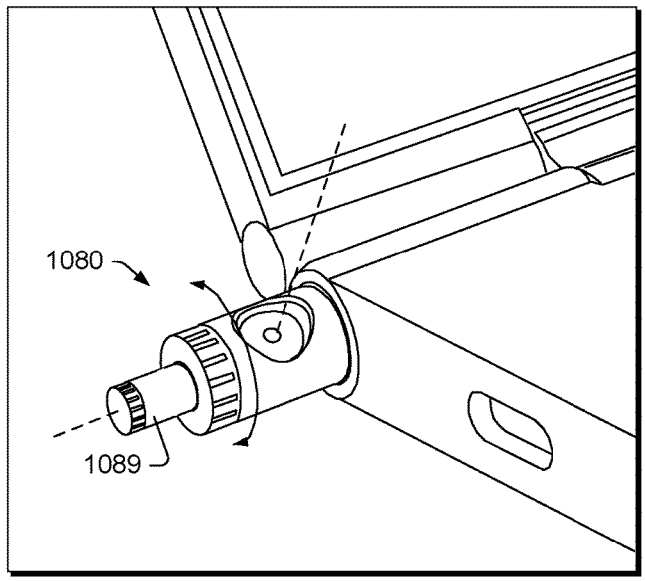
FIG. 10 is a series of diagrams of an example of a device that includes a retractable camera.
Figure 10:
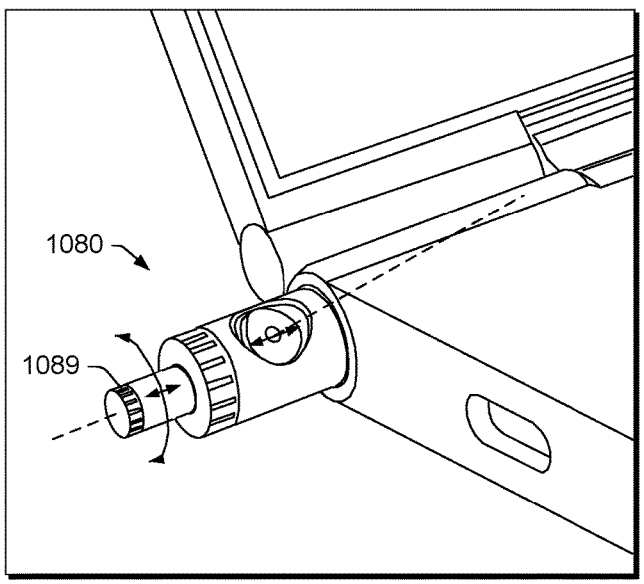

FIG. 10 shows an example of a retractable camera 1080 that includes an adjustment mechanism 1089 that may be utilized to adjust a view. For example, the adjustment mechanism 1089 may be rotatable and/or translatable to adjust an angle of a camera aperture, which may facilitate framing a user's face (e.g., a face of another individual, a scene, etc.).

Figure 11:
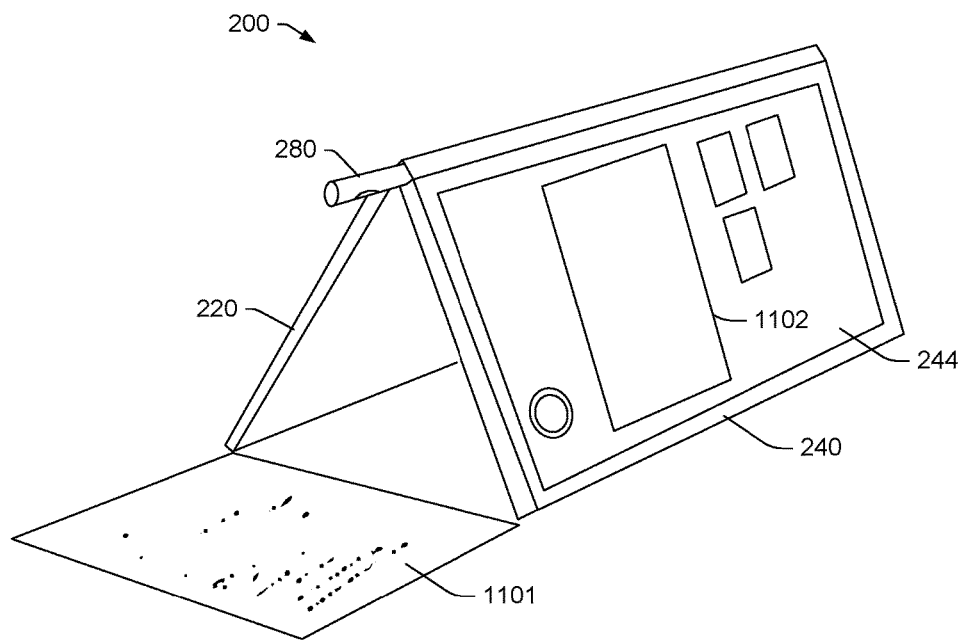
FIG. 11 is a diagram of an example of the device of FIG. 2.

FIG. 11 shows an example of the device 200 in a tent orientation. In such an example, the retractable camera 280 may be directed toward a document 1101 that may be scanned or otherwise captured via an application that executes at least in part using a processor of the device 200. As an example, when the device 200 is in the tent orientation, an application may receive information from one or more sensors that indicate that the device 200 is in the tent orientation. For example, a hinge sensor may sense orientation of one or more of the housings 220 and 240 and/or an accelerometer or gravitometer may sense orientation of one or more of the housings 220 and 240.

In such an example, the application may render a graphical user interface to the display 244 of the display housing 240 where a user may select a mode of operation of the retractable camera 280 where one or more mode options are rendered. For example, in the example of FIG. 11, three mode options may be rendered: a document scanning mode option, a videoconferencing option (e.g., camera facing a user) and a scene capture mode (e.g., camera facing away from a user). Such options may be associated with one or more applications or application features (e.g., a document OCR application, a videoconferencing/communication application, and a photo editing application). As an example, the retractable camera may be utilized as an input device where, for example, an angle of rotation of the retractable camera about its axis may automatically select a mode of operation. In the example of FIG. 11, where the device 200 is in the tent orientation, pointing the retractable camera 280 downwardly may select a document scanning mode of operation, pointing away from the display 244 of the display housing 240 may select a scene capture mode of operation and pointing toward a user facing the display 244 of the display housing 240 may select a videoconferencing mode of operation. In such an example, where a graphical user interface renders modes of operation graphics, rotation of the retractable camera 280 may highlight a particular mode of operation graphic and, when stationary for a period of approximately a few seconds, that mode of operation may be automatically selected.

Figure 12:
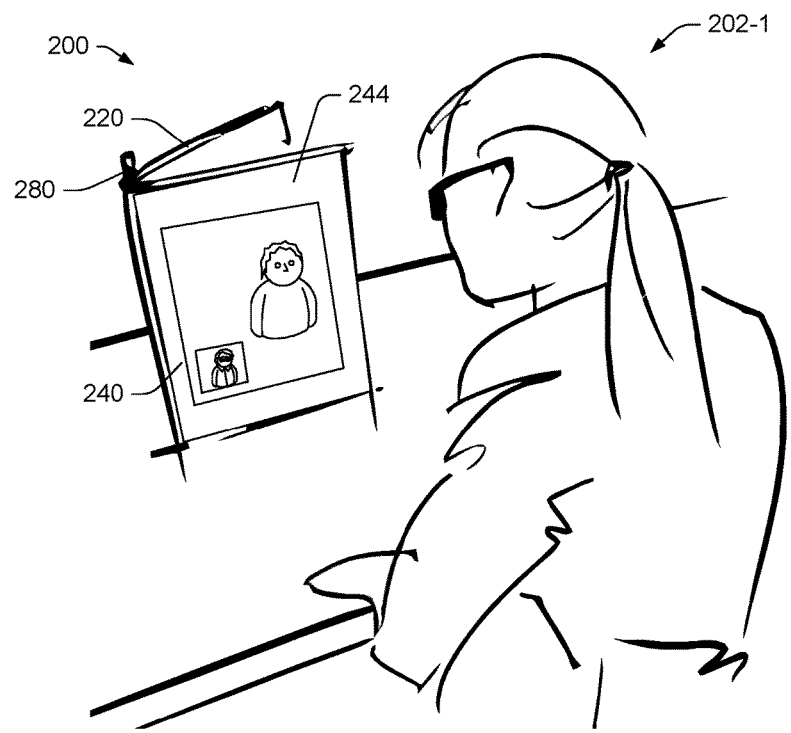
FIG. 12 is a diagram of an example of the device of FIG. 2.

FIG. 12 shows an example of the device 200 in a portrait orientation. In such an example, a user may operate the device 200 as a communication tool for videoconferencing with one or more other people. As shown, images of a distant person and the user may optionally be rendered to the display 244 of the display housing 240 where the smaller image corresponds to a local user 202-1. In such an example, the retractable camera 280 is facing the local user 202-1.

Figure 13:
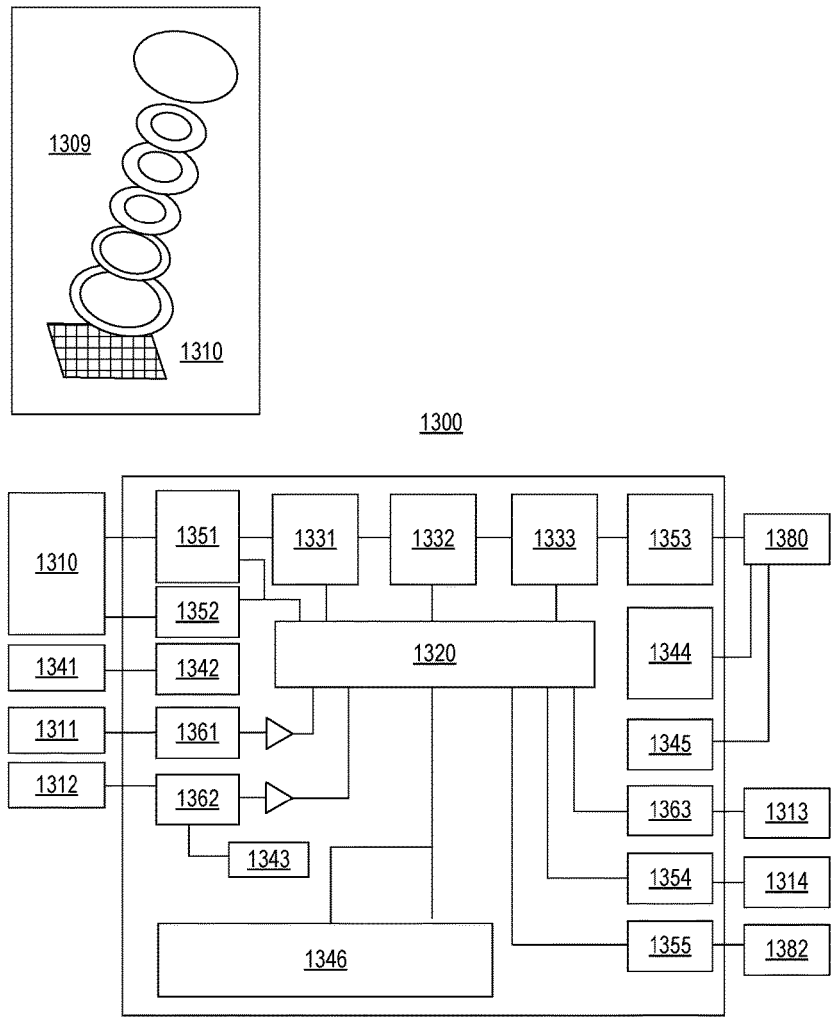
FIG. 13 is a series of diagrams of examples of components.

FIG. 13 shows an example of a camera assembly that includes an image sensor 1310 and one or more lenses 1309 in an exploded view. FIG. 13 also shows circuitry 1300 as including various components. The components may be grouped, for example, as peripherals such as an image sensor 1310, a microphone 1311, a photo sensor 1312, one or more IR LEDs 1313 and a digital photocell 1314; as registers such as registers 1320; as image processors such as a scaler 1331, a compression component 1332 (e.g., JPEG, etc.), and a frame buffer 1333; as power and/or clock components such as a crystal clock 1341, an Xtal clock 1342, a battery supply 1343, a power down memory retention component 1344, and a power down component 1345; and digital interface components such as a BT.656 format component 1351, an I²C master bus (e.g., SCCB) component 1352, one or more I²Cs and/or SPIs and/or UART components 1353, an I2C master component 1354 and one or more GPIOs component 1355. As shown, the circuitry 1300 can be operatively coupled to a host processor 1380 and a sensor host/status component 1382. As an example, a device can include one or more of the circuitry components of the circuitry 1300. For example, the device 200 may include one or more of the circuitry components of the circuitry 1300. As an example, a retractable camera can include an image sensor or image sensors. As an example, the device 200 of FIG. 2 can include one or more of the components shown in FIG. 13.

As an example, a device can include a processor; memory operatively coupled to the processor; a display housing that includes a display operatively coupled to the processor; a keyboard housing that includes a keyboard operatively coupled to the processor, a retractable camera operatively coupled to the processor, and a socket mechanism that translates the retractable camera between a retracted state and an extended state; and a hinge that couples the display housing to the keyboard housing. In such an example, the retractable camera can be rotatable. For example, the retractable camera can be rotatable about a translational axis by more than approximately 10 degrees. Such a retractable camera may be limited in rotation about the translational axis to less than approximately 360 degrees.

As an example, a retractable camera can include a knurled surface. As an example, a retractable camera can include a cylindrical camera housing that may translate along a longitudinal axis where, for example, the cylindrical camera housing rotates about the longitudinal axis.

As an example, in a tented orientation of a display housing and a keyboard housing of a device, a retractable camera can be operable in a document scanning mode. For example, in the document scanning mode, the retractable camera can include an adjustable field of view. A device can include a document scanning application executable by a processor in a document scanning mode.

As an example, in a portrait orientation of a display housing, a device can include a retractable camera that can be operable in a user imaging mode.

As an example, in a notebook orientation of a display housing and a keyboard housing of a device, the device can include a retractable camera that can be operable in a user imaging mode, which can be a videoconferencing mode.

As an example, a retractable camera can include at least one optical element. An optical element can be a lens. As an example, a retractable camera can include an adjustable lens or lenses. For example, consider focus adjustment and/or zoom adjustment effectuated by an adjustable lens or lenses.

As an example, a retractable camera can have a longitudinal axis and a light aperture that has an axis that forms an angle that is less than 90 degrees with respect to the longitudinal axis. For example, such an angle may be about 10 degrees to about 50 degrees to aim the light aperture at a head of a user.

As an example, in a retracted state, a light aperture of a retractable camera can be disposed entirely within a keyboard housing where, in an extended state, the light aperture of the retractable camera is not disposed within the keyboard housing.

As an example, in a retracted state, a light aperture of a retractable camera can be covered by an opaque material.

As an example, in a retracted state, a retractable camera can be in a dormant mode.

As an example, a device can include circuitry that transitions a retractable camera from a dormant mode to an active mode responsive to a transition of the retractable camera from a retracted state to an extended state.

As an example, a device can include a plurality of retractable cameras. For example, a device can include one retractable camera and another retractable camera where the retractable cameras are operable in a front and back mode. Such cameras may be operable independently and/or adjustable independently, for example, as to angle of view. For example, retractable cameras may be on a common retractable camera housing that can be translatable from one or more retracted states to one or more extended states. As an example, in an extended state where two cameras are extended out of a socket of a keyboard housing, the two cameras may be independently aimed, for example, one pointing away from a user and one pointing toward a user. As an example, a device can include retractable cameras that are operable in a stereoscopic mode.

As an example, a device can include circuitry that renders images captured by one or more retractable cameras to a display of the device as may be carried by a display housing. As an example, such circuitry can include one or more processors, which may include one or more graphics processors. As an example, a method can include receiving light from one or more objects via an aperture of a retractable camera, and converting the light into pixels at least in part via an image sensor that receives the light where the image sensor may measure, for example, color and brightness of light received by the image sensor. In such an example, the pixels can be represented as binary numbers that are transmissible via an interface, a bus, etc., storable in memory, etc. As an example, a device can include a framebuffer memory that includes random access memory (RAM) that can store bitmaps (e.g., pixel values) for rendering to a display.

As an example, a display of a display housing can be bezel-less with respect to the display housing. As an example, an area of a display as defined by x and y dimensions can be greater than approximately 98 percent of the area of a display housing as defined by x and y dimensions. In such an example, a display housing may include an x dimension that is less than approximately 40 cm and may include a y dimension that is less than approximately 40 cm.

As an example, a device can include a display housing that is camera-less. As an example, a retractable camera can include a gimbal mechanism, which may, for example, be part of a stabilization system to reduce effects of camera movement. As an example, a retractable camera can include a swivel mechanism.

As an example, a socket mechanism of a keyboard housing can include at least one spring. As an example, a socket mechanism can include a cam and a cam follower. As an example, a socket mechanism can include a spiral thread. As an example, a socket mechanism can include a push button mechanism.

As an example, a retractable camera can include a light, which may be a flash and/or a video light to illuminate a scene during video image capture, streaming, etc.

As an example, a retractable camera can include a microphone. As an example, a retractable camera can include an air gap state such that information acquired by an image sensor and/or a microphone may be incapable of being transmitted from the retractable camera to circuitry of a device such as circuitry of a keyboard housing. For example, in a retracted state, a retractable camera may have an air gap or air gaps with respect to one or more interfaces.

As an example, a device can include circuitry that launches a communication application responsive to a transition of a retractable camera from a retracted state to an extended state.

As an example, device can include communication circuitry where a retractable camera transitions from a retracted state to an extended state responsive to receipt of a communication by the communication circuitry. For example, upon receipt of a phone call, a VoIP call, etc., the communication circuitry may issue a signal to a socket mechanism that includes a retractable camera disposed at least in part in a socket such that the socket mechanism is actuated to transition the retractable camera from a retracted state to an extended state.

As an example, in a retracted state of a retractable camera, an air gap can exist for an electronic interface between circuitry of the retractable camera and circuitry of a keyboard housing that includes a socket in which at least a portion of the retractable camera is disposed.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
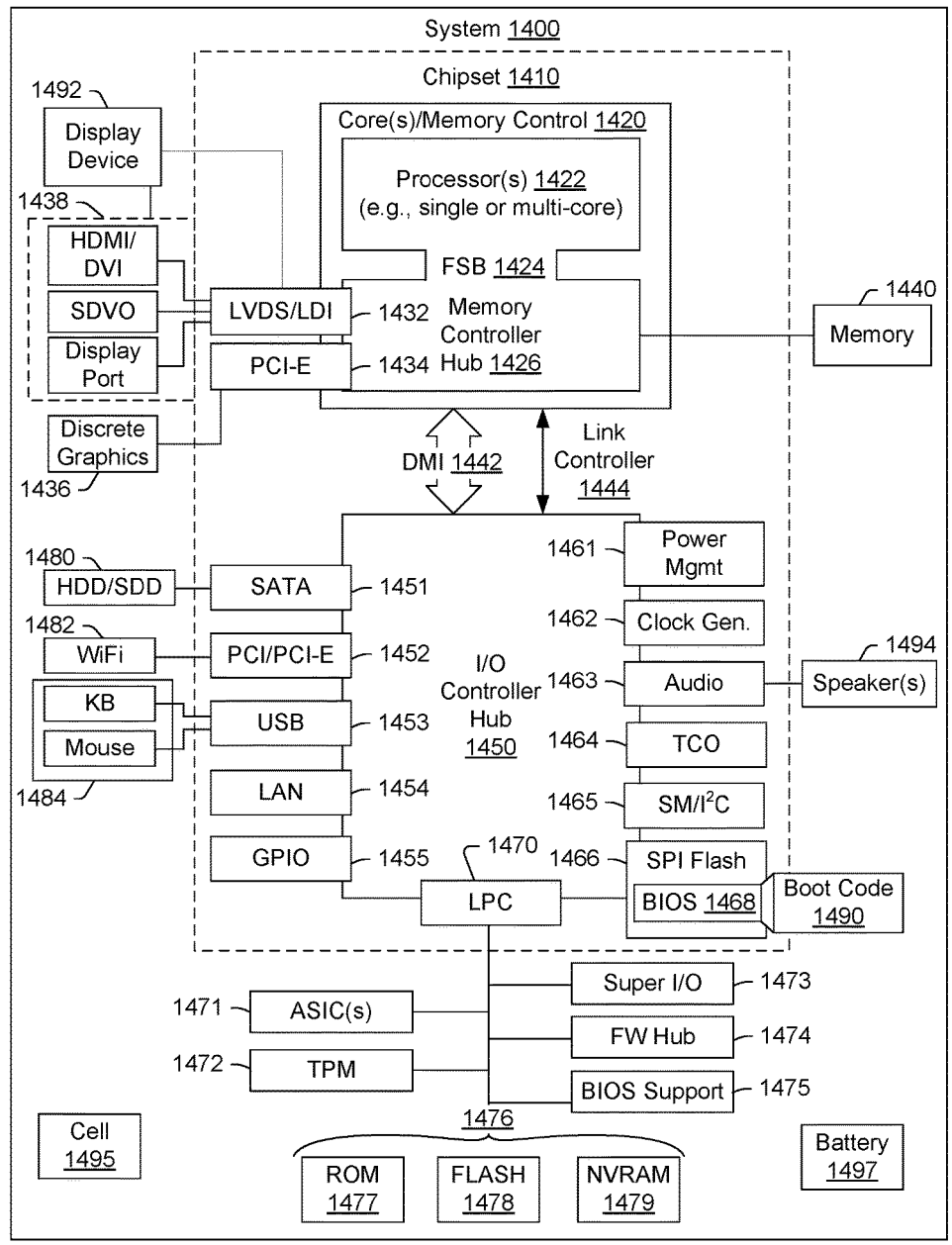
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400. As an example, the device 200 can include one or more features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a processor;
   memory operatively coupled to the processor;
   a display housing that comprises a display operatively coupled to the processor;
   a keyboard housing that comprises a keyboard operatively coupled to the processor, a retractable camera operatively coupled to the processor, and a socket mechanism that translates the retractable camera between a retracted state and an extended state; and
   a hinge that couples the display housing to the keyboard housing,
   wherein, in a tented orientation of the display housing and the keyboard housing, the device comprises a document scanning mode for document scanning via the retractable camera.

2. The device of claim 1 wherein the retractable camera is rotatable.

3. The device of claim 2 wherein the retractable camera is rotatable about a translational axis by more than approximately 10 degrees.

4. The device of claim 1 wherein the retractable camera comprises a cylindrical camera housing.

5. The device of claim 4 wherein the cylindrical camera housing translates along a longitudinal axis.

6. The device of claim 5 wherein the cylindrical camera housing rotates about the longitudinal axis.

7. The device of claim 1 wherein the retractable camera comprises a longitudinal axis and wherein a light aperture of the retractable camera comprises an axis that forms an angle that is less than 90 degrees with respect to the longitudinal axis.

8. The device of claim 1 wherein, in the retracted state, a light aperture of the retractable camera is disposed entirely within the keyboard housing and wherein, in the extended state, the light aperture of the retractable camera is not disposed within the keyboard housing.

9. The device of claim 1 wherein, in the retracted state, the retractable camera is in a dormant mode.

10. The device of claim 1 comprising circuitry that transitions the retractable camera from a dormant mode to an active mode responsive to a transition of the retractable camera from the retracted state to the extended state.

11. The device of claim 1 comprising another retractable camera wherein the retractable cameras are operable in a front and back mode.

12. The device of claim 11 wherein the retractable cameras comprise a common camera housing.

13. The device of claim 1 wherein the display is bezel-less with respect to the housing.

14. The device of claim 1 wherein the display housing is camera-less.

15. The device of claim 1 wherein the socket mechanism comprises a push button mechanism.

16. The device of claim 1 wherein the retractable camera comprises a light.

17. The device of claim 1 comprising circuitry that launches a communication application responsive to a transition of the retractable camera from the retracted state to the extended state.

18. The device of claim 1 comprising communication circuitry wherein the retractable camera transitions from the retracted state to the extended state responsive to receipt of a communication by the communication circuitry.

19. The device of claim 18 wherein, in the retracted state, an air gap exists for an electronic interface between circuitry of the retractable camera and circuitry of the keyboard housing.

20. A device comprising:
a processor;
memory operatively coupled to the processor;
a display housing that comprises a display operatively coupled to the processor;
a keyboard housing that comprises a keyboard operatively coupled to the processor, retractable cameras operatively coupled to the processor and operable in a front and back mode, a common socket for the retractable cameras, and a socket mechanism that translates the retractable cameras along a common axis between a retracted state and an extended state; and
a hinge that couples the display housing to the keyboard housing.

* * * * *